(12) United States Patent
Eisenreich et al.

(10) Patent No.: US 11,333,497 B2
(45) Date of Patent: May 17, 2022

(54) COORDINATE MEASURING AND/OR STAKE OUT DEVICE

(71) Applicant: LEICA GEOSYSTEMS AG, Heerbrugg (CH)

(72) Inventors: Stefan Eisenreich, Au (CH); Philipp Lukas Rüst, Herisau (CH); Matteo Carrera, Speicher (CH); Ismail Roman Celebi, St. Gallen (CH); Patrik Titus Töngi, Balgach (CH); Stefan Petkov, Flums (CH); Josef Müller, Oberegg (CH); Markus Geser, Horn (CH); Hannes Maar, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 145 days.

(21) Appl. No.: 16/864,775

(22) Filed: May 1, 2020

(65) Prior Publication Data

US 2020/0348133 A1    Nov. 5, 2020

(30) Foreign Application Priority Data

May 2, 2019 (EP) .................................... 19172210

(51) Int. Cl.
*G01C 15/06* (2006.01)
*G01C 15/00* (2006.01)

(52) U.S. Cl.
CPC ........... *G01C 15/06* (2013.01); *G01C 15/004* (2013.01); *G01C 15/006* (2013.01)

(58) Field of Classification Search
None
See application file for complete search history.

(56) References Cited

U.S. PATENT DOCUMENTS

| 5,903,235 A | 5/1999 | Nichols |
| 6,023,326 A * | 2/2000 | Katayama ............ G01C 15/002 33/290 |

(Continued)

FOREIGN PATENT DOCUMENTS

| EP | 2669707 A1 * | 12/2013 | ............. G01S 17/08 |
| WO | WO-2018197588 A1 * | 11/2018 | ........... B25H 1/0078 |
| WO | 2019/002554 A1 | 1/2019 | |

OTHER PUBLICATIONS

Extended European Search Report dated Dec. 12, 2019 as received in Application No. 19172210.7.

*Primary Examiner* — Christopher W Fulton
(74) *Attorney, Agent, or Firm* — Maschoff Brennan (57) ABSTRACT

A coordinate measuring and/or stake out device can be designed for being hand-held (one-handed), free carriage and movement by a user. A position giving means is for determination of an actual translational position of the device using an external position reference and an orientation giving means for determination of an actual rotational position of the device, such that the actual position of the device with respect to all six degrees of freedom of the device can be determined. A radiation source is for generation of a radiation beam as measuring and/or marking beam for measuring and/or visually marking of an object point. A beam steerer is for automatic steering of an alignment of the beam, whereby the beam which differ in the manner of automatic steering the beam alignment.

19 Claims, 8 Drawing Sheets

(56) References Cited

U.S. PATENT DOCUMENTS

| | | | | |
|---|---|---|---|---|
| 6,140,957 A * | 10/2000 | Wilson | ............ | G01C 15/00 342/357.32 |
| 6,381,006 B1 | 4/2002 | Ramstrom | | |
| 6,606,798 B2 * | 8/2003 | El-Katcha | ............ | G01C 15/004 33/227 |
| 6,763,595 B1 * | 7/2004 | Hersey | ............ | G01C 15/004 33/286 |
| 7,818,889 B2 * | 10/2010 | Bernhard | ............ | G01C 15/06 33/293 |
| 9,146,106 B2 * | 9/2015 | Bank | ............ | G01C 15/006 |
| 9,233,751 B2 * | 1/2016 | Metzler | ............ | G05D 1/102 |
| 9,234,742 B2 * | 1/2016 | Bridges | ............ | G06K 9/00355 |
| 9,377,301 B2 * | 6/2016 | Neier | ............ | G01S 3/782 |
| 9,407,364 B2 * | 8/2016 | Dumoulin | ............ | G01C 15/004 |
| 9,513,120 B2 * | 12/2016 | Briggs | ............ | G01C 15/06 |
| 9,952,047 B2 * | 4/2018 | Nordenfelt | ............ | G01C 15/002 |
| 10,119,818 B2 * | 11/2018 | Maar | ............ | G01B 11/0608 |
| 10,274,316 B2 * | 4/2019 | Siercks | ............ | G01C 15/002 |
| 10,300,573 B2 * | 5/2019 | Kahle | ............ | G01C 15/02 |
| 10,753,740 B2 * | 8/2020 | Kotzur | ............ | G01C 15/008 |
| 2014/0247439 A1 | 9/2014 | Neier et al. | | |
| 2016/0349746 A1 * | 12/2016 | Grau | ............ | G05D 1/0094 |
| 2019/0094021 A1 | 3/2019 | Singer | | |

* cited by examiner

COORDINATE MEASURING AND/OR STAKE OUT DEVICE

CROSS-REFERENCE TO RELATED APPLICATIONS

This application claims priority to European Patent Application No. 19172210.7 filed on May 2, 2019, which is incorporated herein by reference.

FIELD OF THE INVENTION

The invention relates to a mobile coordinate measuring and/or stake out device that can be hand-held, and relates to a system comprising the device.

BACKGROUND

In order to survey one target point or, in particular, a plurality of target points, numerous geodetic survey devices have been known since antiquity. Here, distance and direction or angle from a surveying device, the absolute position of which is known, to the target point to be surveyed are recorded as spatial standard data. Well-known modern examples of such geodetic surveying devices are tachymeters and total stations, which are also referred to as electronic tachymeter or computer tachymeter. For aiming at or targeting the target point to be surveyed, geodetic surveying devices of this type have, for example, a telescopic sight, for example, an optical telescope, as a targeting apparatus. The telescopic sight is generally rotatable about a vertical standing axis and about a horizontal tilt axis relative to a base of the measuring device, so that the telescope can be aligned on the point to be surveyed by pivoting and tilting. Modern devices can have, in addition to the optical vision channel, a camera, which is integrated in the telescopic sight and is aligned coaxially or in parallel, for example, for acquiring an image.

It is often the case that the target point, e.g. a boundary marker, cannot be directly targeted by the surveying device due to obstacles which interrupt the line of sight. Hence, points are surveyed in a number of geodetic applications by virtue of specially embodied target objects being placed thereon. According to the prior art, these consist of a rod as object support with a marking that can be targeted or with a retroreflector as target object. For surveying purposes, the tip of this plumb rod with the target point is brought into contact with the ground and held perpendicular to determine the direction. In so doing, in order to determine the distance, the rod will be aligned horizontally in such a way by rotating it about its vertical axis that the marking or the reflector reflects a light signal emitted by the surveying device back in the direction of the latter. Alternatively, use is made of 360° reflectors, which reflect light signals back from any horizontal alignment.

In order to enable geodetic surveying by a user on his own, some total stations according to the prior art have means for mechanizing the target optical unit, for automated target search and tracking and for remote control, as a result of which measurements can be performed by means of a suitable remote control unit from the target point. Modern total stations moreover contain microprocessors for digital further processing and storing of registered measurement data and a radio data interface for establishing a radio connection to external peripheral components such as e.g. a data-registering device attached to the surveying rod.

In many geodetic applications, points are surveyed by placing specially designed target objects thereon. These typically consist of a surveying rod having a targetable module, for example, a reflector for defining the measurement section or the measurement point. These target objects are targeted by means of a surveying device, a direction and a distance to the objects are determined, and a position of the objects is thus derived.

Similarly, to this point measurement, marking of already known target points or of points, the position of which was defined prior to a marking procedure, can be performed. In contrast to the point measurement, in this case, the position or the coordinates of the points to be marked are known and are to be marked. For such a marking procedure, a plumb stick or a surveying rod is conventionally also used, which rod is carried by a user and positioned on a target point. For this purpose, the user can move toward the target position of the target point based on position information generated by the surveying device, wherein the surveying rod is automatically targeted by the surveying device by a second person or by an automatic mechanism assigned to the surveying device. If the target point has been reached, the user can perform a marking of the point.

In general, a disadvantage of using such a plumb stick or surveying rod for geodetic or industrial surveying or stake-out in construction or manufacturing is that conveying and carrying a rod, which can be more than two meters long, is cumbersome to the user and particularly laborious in terrain that is difficult to pass, e.g. a wooded area. Moreover, perpendicular set up of the rod is connected to a certain amount of time expenditure and perpendicular holding during the measurement is arduous for the user. Incorrect setup of the rod at the target point is a source of error for an incorrect determination of position.

A further disadvantage is that target points could lie in such a way that perpendicular positioning of the rod on the target point is impossible or that it is even impossible to establish physical contact, e.g. if the target point is a corner of a building, if visual obstacles, e.g. bushes and trees, are present between the total station and the target object or if the surroundings of the target point cannot be entered by the user. Such situations require specific measurement methods, which are connected to additional time expenditure.

U.S. Pat. No. 6,381,006 B1 discloses a method and a corresponding device, by means of which surveying of inaccessible target points is possible. To this end, a plumb rod is equipped with at least two sensor elements, the absolute positions of which are determined by means of one or more reference stations, e.g. a geodetic surveying device. Furthermore, the plumb rod has a distance-measuring device, which measures the distance between distance-measuring device and a target point to be surveyed based on a visible measurement beam. The positions of the sensor elements and of the distance-measuring device relative to one another and the orientation of the distance-measuring direction are known. Hence, it is possible to calculate the absolute position of a target point from the measured distance and the measured absolute positions of the sensor elements.

However, the method according to the U.S. Pat. No. 6,381,006 B1 does not avoid the above-described disadvantages connected with the use of a plumb rod. Furthermore, it is disadvantageous that at least two sensor elements are required for determining the absolute position, which moreover must have a certain minimum distance between one another for sufficient resolution accuracy. As a result, the plumb rod becomes even more unwieldy. In addition, the alignment of the measurement beam (change of position and orientation of an alignment line) is purely manual by manual change of position of the surveying rod, e.g. by tilting the rod.

WO2019002554 A1 discloses a position enabled image projector or a surveying rod wherein position and orientation of the device with respect to all six degrees of freedom can be determined. The position is externally measured by a master device such as a total station and the orientation by sensors such as inclination sensors arranged at the device itself. This allows e.g. for an accurate projection of a blueprint on an object's surface or accurate measurements even if the surveying rod is not adjusted strictly vertical. However, according to the WO2019002554 A1, there is still the need of a tripod for placement of the image projector respectively of a rod for contacting and measuring a surveying point.

U.S. Pat. No. 5,903,235 discloses a geodetic surveying device that can be hand-held, with which surveying can be performed without use of a geodetic surveying device having a distance and direction measurement functionality and without use of a plumb rod or pole. Here, the target point to be surveyed is targeted by a pointing unit, e.g. a laser pointer. The position of the surveying device relative to the target point is established firstly by measuring the distance between device and target point in a defined direction by means of an integrated distance-measuring unit. In so doing, there is no need to align the device perpendicularly over the target point since a component which determines the inclination relative to the gravity vector is integrated. The absolute position of the surveying device is determined by a GNSS reception unit, as a result of which it is ultimately possible to calculate the absolute position of the target point due to the preceding measurements. Thus, handling of a plumb rod is dispensed with and it is possible to survey target points that could not be contacted physically by a plumb rod.

However, even when using correction signals, GNSS-based systems only enable a less accurate determination of the position of target points than systems based on the use of the distance and direction measurement functionality of a corresponding geodetic surveying device. Moreover, determining the position is bound to receiving a sufficient number of GNSS signals, which is not always the case, e.g. when tunneling or in narrow road lines. In addition, the emission direction of the laser pointer is fixed which makes correct pointing to a target point difficult or even impossible in some arrangements.

SUMMARY

In some embodiments, the present invention provides an enhanced device, which enables a system for surveying of target points to be measured and/or stake out of design points.

In some embodiments, the present invention provides a coordinate measuring and/or stake out device by means of which hardly accessible points can be measured resp. marked, with easy and convenient user handling for measuring and/or stake out tasks resp. with enhanced user support in measuring and/or stake out.

In some embodiments, the subject matter of the invention is a hand-holdable coordinate measuring and/or stake out device for hand-held, in particular one-handed, free carriage and movement/handling by a user, e.g. by a housing for hand-held usage. The device comprises a position giving means for determination of an actual translational position of the device using an external position reference, for example a GNSS-receiver or a measureable target such as a retroreflector serving as a target for an external measuring device such as a total station. The device further comprises an orientation giving means for determination of an actual rotational position of the device, e.g. an Inertial Measurement Unit (IMU). Due to the position and orientation giving means, the actual position of the device with respect to all six degrees of freedom (all rotational and translational DoF) of the device can be determined.

In some embodiments, the device further comprises a radiation source for generation of a radiation beam, particularly a laser beam, as measuring and/or marking beam for measuring and/or visually marking of an object point, and a beam steerer for automatic steering of an alignment of the beam, preferably with respect to at least two steering axis. Optionally, in case of measuring purpose, the device comprises a radiation detector or sensor for detection of parts of the radiation beam reflected back from an object (point) to be measured.

In some embodiments, the beam steerer comprises at least two beam steering operating modes which differ in the manner of automatic steering the beam alignment.

That means that the device has a beam steerer for aimed steering of an emission direction of the beam and for example a beam steerer controller designed to control the beam steerer in at least two automatic beam steering operation modes which allow for at least two different ways of automatic steering the beam.

Optionally, the beam steerer is designed to switch automatically between the two operating modes in dependence on sensor data, whereby preferably the sensor data provided by a sensor of the device, e.g. the orientation giving means. As a further option, the beam steerer is designed to adapt the automatically switching, in particular to a respective user, by machine learning.

In some embodiments, the at least two operating modes comprise a first and a second stabilization mode for stabilization of the beam alignment in order to compensate involuntary (unintentional) shifts of the housing, e.g. a shaking or jitter of the device, for example due to trembling of the user's hand holding the device or due to a shaky carrier. In the first stabilization mode, the beam alignment is strictly stabilized, whereas in the second stabilization mode, the beam alignment is semi-stabilized such that the beam follows a shift tendency.

The device according to this embodiment possesses two modes, each for automatic steadying of beam position, whereby the second stabilization mode is so to say "softer" and allows for a drift e.g. of the housing to be transformed in a change of the beam alignment whereas the first stabilization mode the beam position is more firmly stabilized. In the first stabilization mode, small but intentional movements of the device may be suppressed which would hinder manual fine-alignment of the beam. Thus, the second stabilization mode e.g. allows for an interruption of the strict stabilization mode, without losing beam stabilization in general or at all while enabling fine adjustment of the beam position.

An exemplary workflow using the advantage of the two stabilization mode could be as follows: first, the beam steerer is operated in the second stabilization mode which enables fine aiming at an object point, despite the point lying in the far field and despite jitter of the user's hand. Once the point is hit, the user manually or the device itself switches to the first stabilization mode wherefore the fine-aimed alignment is hold resp. even better guaranteed than in the second stabilization mode as shaking is more heavily equalized in the first stabilization mode.

In some embodiments, the beam steerer is designed to switch automatically between the first and the second stabilization mode in dependence on a sensed movement of the device, in particular switching is executed if the shift tendency is above or below a defined threshold and/or if a shift pattern is sensed. If for instance the amount and/or velocity of a sensed movement in a shift direction within a defined period of time reaches a certain value, the beam steerer controller automatically toggles the other stabilization mode.

In some embodiments, the at least two operating modes comprise a first and a second beam lock mode, wherein in the first lock mode the beam alignment relative to the housing is locked and in the second lock mode the beam is locked onto an object point. In other words, the first lock mode "freezes" the emission direction of the beam, the second lock mode binds the beam to an object point, despite movement of the device.

In some embodiments, one of the operating modes is a multi-point mode designed to steer the beam continuously in a direction (e.g. a straight line or a spiral or curve), in particular repeatedly and/or in form of a predefined pattern (e.g. a zig-zag-pattern), such that a multitude of neighbored object points is measured and/or marked, in particular in form of a dense point line or dense point area.

In some embodiments, one of the operating modes is an auto-align mode designed to automatically steer the beam to an object point of interest, in particular within a defined solid angle around an initial beam alignment, wherein the object point of interest is automatically detected by the device based on data of a device's sensor, for example a camera, and/or the beam is successively aligned such that a sequence of object points of interest is automatically measured and/or marked, for example the beam is steered from a first design point to the next design point in the vicinity of the first point.

In some embodiments, one of the operating modes is a graphic projection mode designed to automatically steer the beam in such a way that a visual graphic is projected by the beam onto an object's surface, preferably wherein the visual graphic is a user navigation information indicating a direction and/or distance to an object point to be measured and/or marked or a geographic direction, in particular north direction, or a direction and/or distance to the external position reference.

In some embodiments, the beam steerer comprises an active gimbal, wherein the gimbal is carrying or encasing the radiation source.

In some embodiments, the beam steerer comprises a micro scanning mirror and/or a scanning galvo (galvanometer) mirror and/or an array of movable mirrors.

In some embodiments, the beam steerer comprises at least one rotatable wedge prism.

In some embodiments, the device comprises an visual and/or audio display unit designed for user guidance with respect to beam steering. Alternatively or additionally, the device comprises a communication unit for transfer of such beam steering user guidance data to an external display device such as a total station or controller.

In some embodiments, the device comprises a separate or special user button which is conceived and reserved for manually switching between the at least two operating modes.

In some embodiments, the position giving means is embodied as a retroreflector or a GNSS-module.

In some embodiments, the orientation giving means is embodied as an Inertial Measurement Unit and/or tilt and heading sensors.

In some embodiments, the radiation source is part of an Electronic Distance Meter.

In some embodiments, the device is body-wearable.

In some embodiments, the invention also pertains to a surveying system comprising a surveying instrument, in particular a total station or a GNSS survey pole (surveying instrument with position determination by GNSS), and a coordinate measuring and/or stake out device according to the invention.

Optionally, the system comprises a computer (e.g., computer with processor and non-transient memory device having computer executable instructions) with an state estimator algorithm designed for computation of the actual position of the device, in particular wherein a distance measured with the radiation beam is fed into the state estimator for the position computation.

In some embodiments, the invention thus provides a coordinate measuring and/or stake out device with enhanced adaptability to different measurement and/or stake out situations due to its flexibility with respect to many degrees of handling freedom and the provision of two or more different operating modes. In addition, fulfilling tasks is simplified or even enabled in the first place in view of certain specific situations by the different beam steering operating modes.

The device according to the invention is user-friendly and unburdens the user in many respects such as search of target points, aiming at target points and keeping contact with a target point. In preferred embodiments with automatic switch instead of manual switch between operating modes, the effort for the user is even further reduced.

Additionally, the device enables measurement and/or stake out of points which cannot been satisfactorily treated with prior art devices and/or enhances precision of the results and/or reduces effort in time or means/measures.

Amongst others, the following problems are eliminated or at least reduced compared to nowadays standard methods: reduced effort because less need of making new total positioning system (TPS) setups, faster stake-out procedure using a beam-steered EDM, no effort in manually holding the handheld device quiet by using a beam steering element, measurements of remote points and/or points further away than the typical pole length (2 m) possible, no surveying pole needed and accordingly no pole height errors and no errors by mechanical bending of the pole as the distance to the target is measured with an EDM, no explicit north direction needed or otherwise manual alignment to a given coordinate system and having at least one hand free for marking while the handheld is projecting laser on design point (having two hands free in case of optional pole stand).

BRIEF DESCRIPTION OF THE DRAWINGS

The device according to the invention will be described in more detail below on the basis of embodiments and application procedures depicted schematically in the drawings. The figures are purely illustrative and not scaled. In detail.

DETAILED DESCRIPTION

Figure 1A:
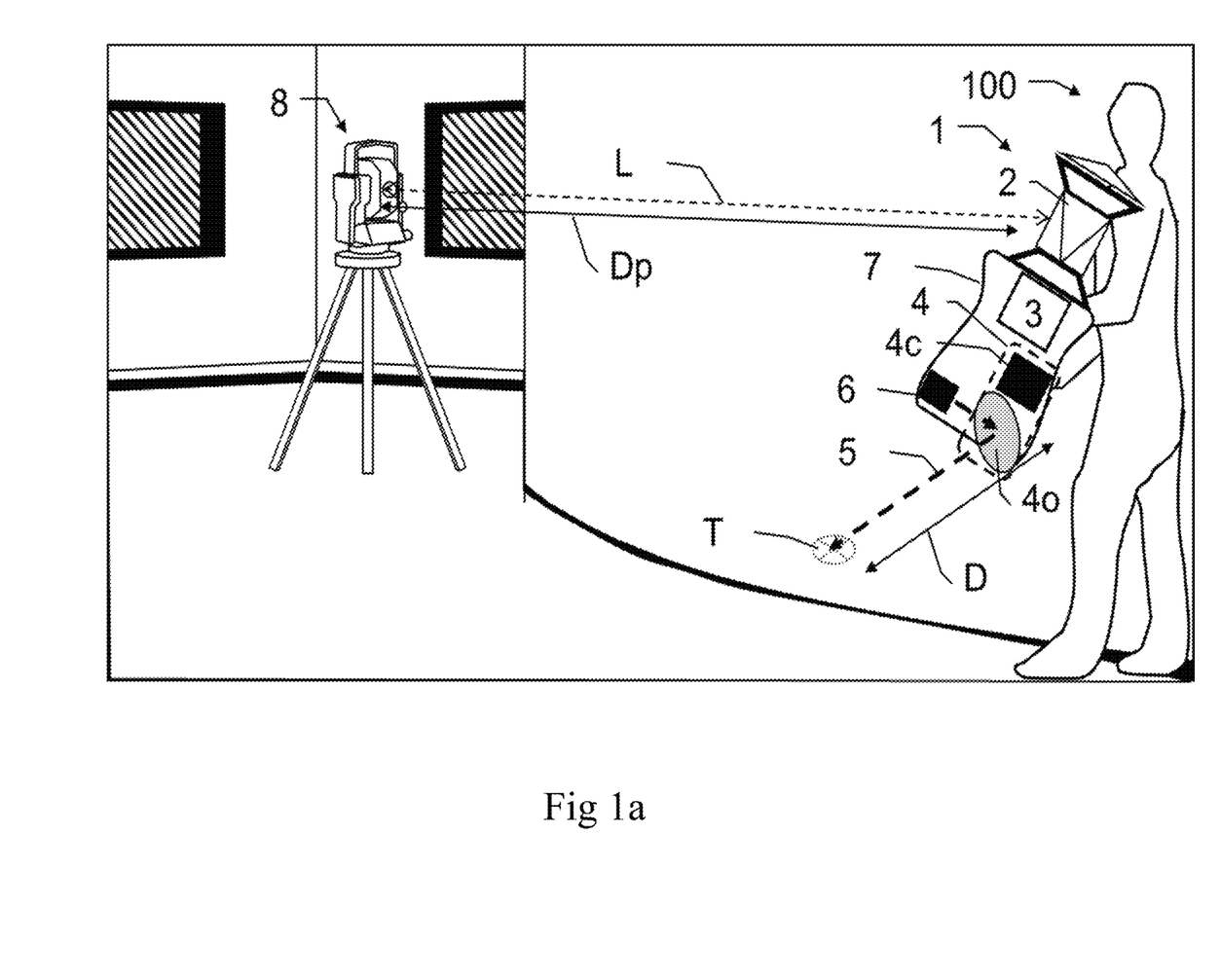
FIGS. 1a-1b show a first example for a coordinate measuring and/or stake out device and its application.
Figure 1B:
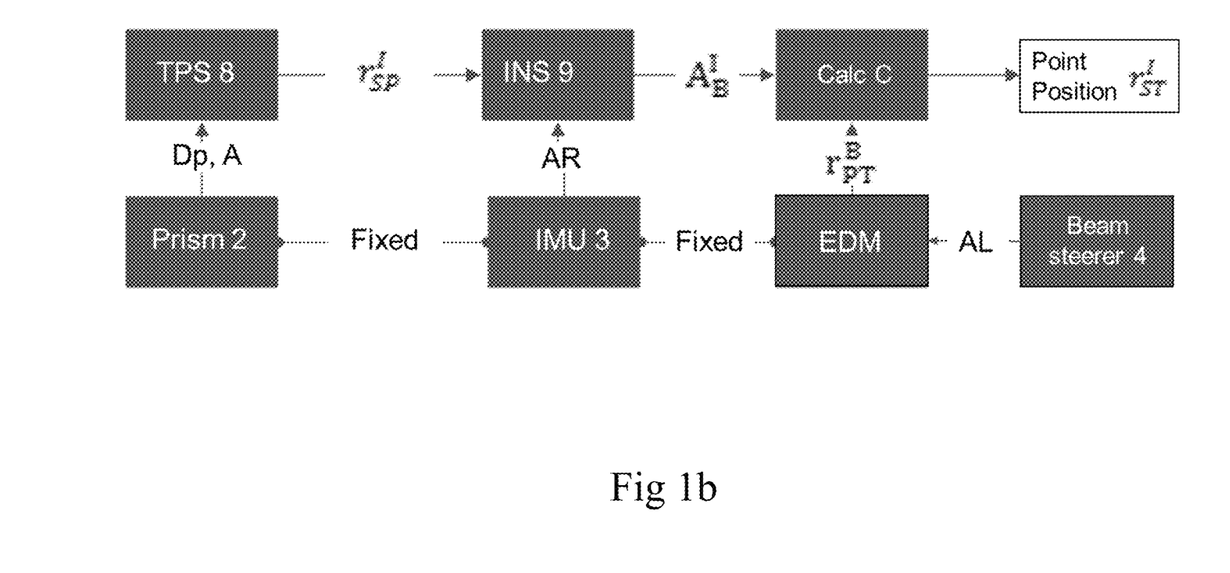

FIGS. 1a and 1b show an example for a coordinate measuring and/or stake out device 1 according to the invention. Shown is a user 100 in a room, who holds the device 1 to measure and/or mark a point T of the room. The device 1 comprises a housing 7 which is designed for hand-held usage. Optionally, the housing 7 comprises a adapter or coupling for attachment to a carrier, socket or stand, e.g. a pole stand, or body wearable holder, e.g. a helmet or work clothes. As a further option, a housing's clip, clasp, fastener or the like serves for attachment of the device to a wall or ceiling of an object. Such a non-permanent fixation of the device 1 is for instance useful for stake out, particularly enabling the user 100 to position the device 1 for hands-free working at an object point marked by the device 1. The handy housing 7 resp. the device 1 is for example designed such that a user 100 can carry and move the device 1 one handed. In any case, the device 1 is basically embodied in such a way that the user 100 can freely alter the position of the device 1.

In order to determine the actual position of the device 1 with respect to all six degrees of freedom (DoF), the device 1 comprises a position giving means 2 for external determination of the actual translational position and orientation giving means 3 for determination of the actual rotational position of the device 1.

In the example, the device 1 comprises a, in particular 360°-, retro-reflector 2 as position giving means. The retro-reflector is mounted on the housing 7, in the example on the top, such that it can be aimed at by a coordinate measuring device such as a total station 8 as external position reference, the device 1 and the external measuring station 8 thus forming a measuring system.

As also indicated in FIG. 1b, the total station 8 measures the translational position of the retro-reflector 2 and thus of the device 1 in a fashion known to the skilled person using a laser beam L directed at and reflected by the reflector 2 and detected by a photosensor of the station 8. Hence, the position of the reflector 2 is the linking point to the external, absolute reference system. This position is determined by position surveying by means of the surveying device 8 in which the direction angles and, by means of a run time measurement and/or phase measurement of laser beam L emitted by the surveying device 8, the distance of the reflector 2 is measured relative to the known absolute position of the total station 8 by the station 8. The absolute position of the prism 2 is calculated from angle and distance and absolute position of the surveying device 8. This calculation occurs for example in an evaluation unit of the surveying device 8, and so the surveying device 8 transfers the absolute position data of the retroreflector 2 to an control and evaluation unit of the device 1. However, it is also possible for the measurement data to be communicated, e.g. by Bluetooth, WLAN or Internet, to the control and evaluation unit of the device 1 or an additional processing device such as a tablet or smartphone and for the position calculations to be calculated there.

As an alternative to a measurable target such as a retroreflector 2 (or a plurality of geodetic target objects, which are arranged on different housing sides and are e.g. developed as cylindrical retroreflectors), the translational position is determined using GNSS-signals as external reference wherefore the device 1 comprises a GNSS sensor as position giving means. Further alternatives such a visual determination of the position with an external device such as a station 8 are known the person skilled in the art of coordinate measuring resp. stake out.

As orientation giving means 3, the device 1 comprises in the example an Inertial Measuring Unit (IMU) encased in the housing 7 which measures the accelerations, angular rates and optionally the magnetic field. Alternatively or additionally, the user device 1 comprises single angular sensors and/or inclination sensors or accelerometers (e.g. a 3-axis MEMS accelerometer) and/or a magnetometer and/or a gyroscope or means for determination of an inclination angle of the incoming laser beam L (laser beam direction of incidence determination unit) for determination of the rotational position of device 1.

Further alternatives of orientation giving means such a visual determination of the orientation with an external device such as a camera of a station 8, e.g. imaging a known distribution of marking LEDs on the housing 7 as orientation giving means, are known to the person skilled in the art of coordinate measuring resp. stake out. Position giving means and orientation giving means can also be embodied in one conjoint module.

Further, the device 1 comprises at least one radiation source 6, e.g. a laser, which emits a radiation beam 5 which is used for measuring and/or marking of the point T. A further example for a radiation source is a SLED. For measuring a point T, the device 1 comprises for example a radiation receiving unit/a detector for detecting of radiation reflected back from point T. The alignment of the beam 5 is steerable by a beam steerer 4.

Radiation source 6 and beam steerer 4 may be part of an Electronic Distance Meter (EDM), for determining a distance to point T e.g. using known measuring principles such as Time-of-Flight and/or interferometry. EDM resp. beam steerer 4, orientation giving means 3 and position giving means 2 are mounted in resp. at the housing 7 with known relative position, e.g. fixed positioned and mechanically linked as shown in the figure. Prism 2 and EDM are installed at resp. in the housing 7, however in principle, the different components of device 1 could also be separately mounted as long as their positioning relative to each other is known.

The device 1 optionally comprises additional modules such as an additional laser for simultaneous measurement and/or marking of points or comprises a camera with a field of view covering the beam target area or aiming in the same direction as the beam. Such a camera can be embodied as a time-of-flight camera such that instead or in addition to measurements with the beam 5, a target point T is measured by the camera, particularly in embodiments without an EDM, wherein e.g. the laser beam 5 is used for marking/visual pointing purposes only.

In the example, the beam steerer 4 comprises a beam steering optics 4o which is controlled by beam steerer controller 4c. The steering optics 4o comprises for example a mirror which is pivotable about two axis. The beam steerer 4 resp. the beam steering optics 4o can be embodied e.g. as a (micro) scanning mirror or an array of (micro or nano) mirrors. Further options are one or more galvo mirrors. Alternatively or additionally, the beam steerer 4 comprises one or more rotatable wedge prisms for beam steering.

The beam steerer 4 allows for automatic change of the pointing direction of the beam 5 which—in addition to the free mobility of the device 1 itself—allows for example for measuring or marking of hidden points which are not accessible with prior art measuring or pointing devices.

As illustrated in FIG. 1*b*, an object point T (which can be physically represented by for example a retroreflector, a corner on a wall, a survey nail or similar) is measured as follows:

- The total station 8 measures based on measurement of distance Dp to prism 2 and of angles A the position $r_{SP}^I$ of the retroreflector or prism 2. Optionally and not shown, also the velocity of the prism 2 resp. of device 1 is measured (e.g. when tracking a moving hand-held device 1 by total station 8).
- The inertial measurement unit 3 measures the accelerations and angular rates AR and optionally the magnetic field.
- The measurements of the total station 8 and the IMU 3 are fed into a state estimator 9 (Inertial Navigation System INS).
- The state estimator INS then processes these two kinds of information to get an attitude $A_B^I$ (e.g. represented as quaternion or rotation matrix) of the device in a defined coordinate frame I.
- The distance D to the target point T with its laser beam alignment angles AL, the beam alignment controlled by beam steerer 4, is measured with the EDM, resulting in the position $r_{PT}^B$ of the point T relative to device 1. Optionally, the distance D is fed into the state estimator INS, too, as additional data for calculation of attitude $A_B^I$.
- Using the attitude $A_B^I$ and the position $r_{SP}^I$ of the device and the position $r_{PT}^B$ (and the known fixation of the elements prism 2, IMU 3 and EDM relative to each other), the referenced or absolute position of the target point $r_{ST}^I$ can be calculated by making a lever arm calculation C:

$$r_{ST}^I = r_{SP}^I + A_B^I r_{PT}^B$$

In order to synchronize the individual measurements, a trigger signal is optionally output to the measurements units 8, 3 and EDM, which can be triggered by the user or automatically by the device 1 or any other unit of the surveying system comprising the device 1 and the surveying station 8. For example, the beam steerer 4 outputs the trigger signal in dependence of its operating status.

Additionally, or as an alternative thereto, device 1 and surveying device 8 can have synchronized clocks, in particular GNSS-based clocks, as a result of which individual measurement data can be marked in terms of time. This allows surveying to be carried out, by virtue of measurements of the individual units occurring continuously and asynchronously, as a result of which a trigger unit becomes unnecessary. If sufficiently high measurement frequencies and time overlaps are provided, measurement data lying within a short, defined period of time can be considered as belonging together and target point coordinates can be calculated from these. As an alternative, measurement values can be interpolated or extrapolated on a common base time. A base time can be predefined independently, for example centrally by the control and evaluation unit, or can be defined by the recording time of a measurement value of one of the measuring units. The latter is preferably that measuring unit in which an extrapolation or interpolation would not be expedient due to value profiles that cannot be estimated or in which the extrapolation or interpolation would be afflicted by the greatest uncertainty.

If a point T is to be marked (stake out) instead of or in addition to be measured, the workflow is analogue whereby the known coordinates of the point T are retrieved from a database, e.g. stored in a permanent storage of the device itself or using a communication module such as Bluetooth or WLAN of device 1. Using the measured attitude $A_B^I$ and the position $r_{SP}^I$ of the device and the retrieved design coordinates, the beam 5 can be aligned accordingly such that a design point T is correctly marked by beam 5 e.g. on a room wall as illustrated.

The algorithm (e.g. Kalman filter or divided difference filter or similar) can run on the total station 8, on the handheld device 1 or on any other connected, but mechanically independent computing unit, e.g. a field controller.

According to the invention, the beam steerer 4 can be operated with at least two beam steering operating modes for providing at least two different ways of automated steering of the radiation beam 5. This will be further described with the examples according to the following figures.

Figure 2A:
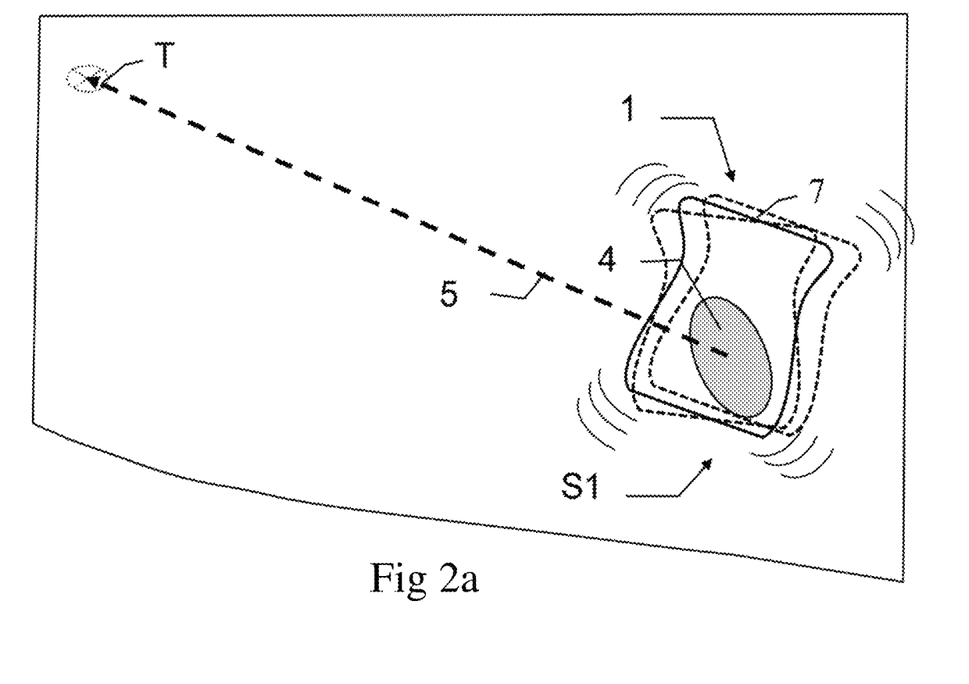
FIGS. 2a-2b show a first example of a beam steering with a first and a second beam stabilization operating mode.
Figure 2B:
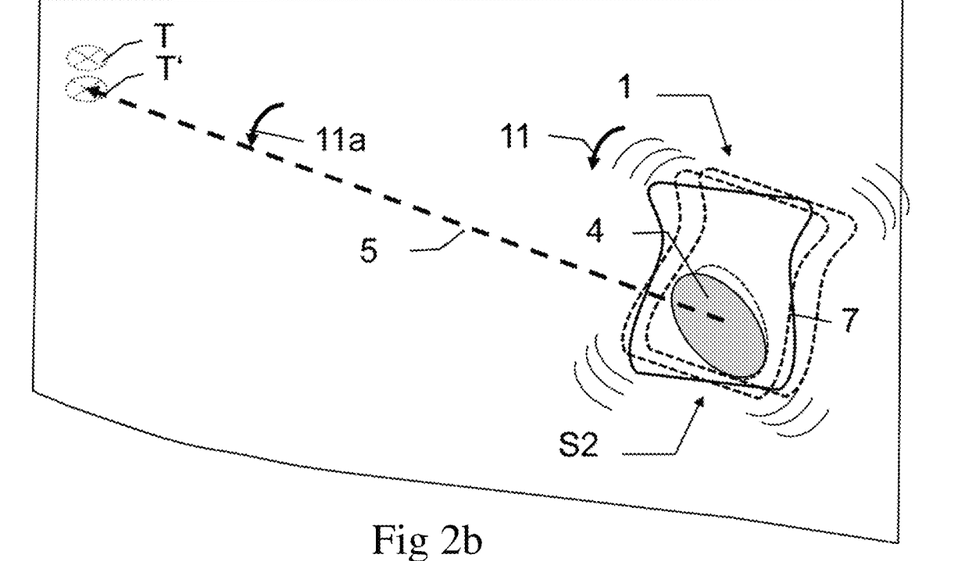

FIGS. 2*a* and 2*b* show a first example of a beam steering with two distinctive beam steering operating modes S1 and S2. For clearness of illustration, only a simplified device 1 is illustrated with a simplified beam steerer 4, indicated only by a beam steerer mirror.

In FIG. 2*a*, a first beam stabilization operating mode S1 is illustrated. As a hand-held device 1 is subject to constant small movements e.g. caused by trembling of the user's hand, the beam steerer 4 is operated such that sway of the device 1 is compensated. This first stabilization mode S1 allows for exact and still pointing at an object point T, even at great distances between device 1 and point T. Said otherwise, the beam steerer 4 equals the shake of the housing 7, and measurement or marking of point T is not disturbed by any involuntary shift of the device 1. This is particularly advantageously for measurement or stake out of points T which are situated quite far away from the device 1 as at long range, already small angle shifts cause rather great change of the impact point of the laser beam 5.

However, if the user intentionally wants to move the device 1 slightly in order to alter the direction of the laser beam 5 a little in order to measure or mark an object point T' near the first point T (see FIG. 2*b*), in the first stabilization mode S1, the device 1 would not distinguish this intentional movement of the device 1 from the unintentional tremor and would try to keep the impact point of beam 5 constant regardless of the user's intentional hand movement. In effect, it would be impossible to measure or mark a point T' nearby point T: either the beam 5 would rest at point T or it would "jump" to far from it following a too bold hand movement (as the beam 5 would not follow a slight hand movement, the user would certainly amplify the hand movement, thus changing the alignment too much).

Therefore, according to the invention and shown in FIG. 2*b*, the beam steerer 4 comprises a second stabilization mode S2. In the second stabilization mode S2, the beam steerer 4 steers the beam 5 such that follows (indicated in the FIG. 2*b* by arrow 11*a*) a movement tendency (indicated in the figure by arrow 11) of the housing 7 (the voluntary shift intended by the user) whilst compensating the housing's jitter. Said otherwise, a basic or constitutive change of position of the device 1 is transformed by the beam steerer 4, whereas unfocused position changes are (still) counteracted. In this second beam operating mode, movement "noise" is filtered out while preserving the medium motion or drift of the housing 7.

This semi-stabilizing operating mode enables the user to change the alignment of laser beam 5 a little whilst again guaranteeing sufficient still pointing due to automatic stabilization. Said otherwise, in the "conflict" between user (fine-)targeting and beam stabilization, the emphasis lies onto targeting in the second stabilization mode S2 whereas in the first mode S1 the focus is on stabilization.

The device 1 thus advantageously provides two different beam stabilization modes S1, S2, allowing for optimized adaption to different measurement or stake out situations. The first stabilization mode S1 can for example be the preferred or main stabilization mode and particularly the better choice in situations when the device 1 is pointing a rather long time at a point T wherefore not only "floundering" might occur but also a slow unintentional shift of the device 1 e.g. due to tiring of a user's arm or of a support or mounting of the device 1. The second stabilization mode S2 advantageously is useful for manual fine targeting/small alignment changes as described above.

An advantageous workflow is for example pointing at a first point T with activated first stabilization mode S1, measuring this first point T, switching to the second stabilization mode S2, manually change orientation of the device 1 such that it points at second point T' nearby, then again switch to first stabilization mode S1. The second mode S2 is in this exemplary workflow used as an interruption of the first stabilization mode S1, allowing for subtle change of targeting direction without abandoning a stabilization of beam emission direction.

Switching between the first and the second stabilization mode and more general between a first and a second beam steering operation mode can be done manually by a user. For example, the device 1 comprises a special user button which is conceived and reserved for toggling between the different available operating modes, e.g. embodied as a singular button on the device's housing. Alternatively, such a user switch is designed to switch only between two different modes such as first and second stabilization mode S1 and S2. For example, if the button is pressed, the second mode S2 is executed, if the button is released, the first mode S1 is executed.

Alternatively or additionally, switching between modes is done automatically, based on sensor data of a sensor of the device 1 and/or of a sensor of external measuring station 8. Preferably, the sensor data is translational and/or rotational position data of the device 1, in particular determined with the readily available positional and/or orientation giving means as sensor.

Figure 3:
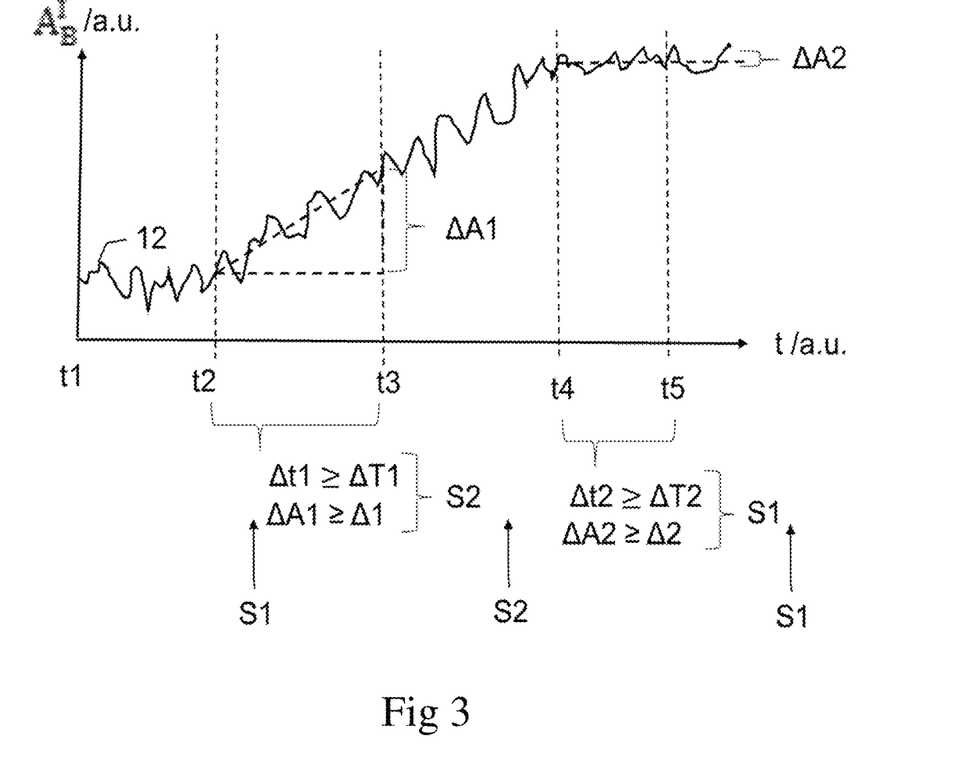
FIG. 3 illustrates automatic switch between two beam steering operating modes.

FIG. 3 illustrates automatic switch between two beam steering operating modes, in the example between the two beam stabilization modes described above. Shown is the measured attitude $A_B^I$ of the device as a function of time t. Due to a switch of the device, the curve 12 shows ups and downs. The device is at the beginning operated with beam stabilization mode S1 to compensate the switch.

From time t2 on, there is a movement tendency, e.g. because the user is trying to purposefully change the pointing direction of the beam by moving the housing. This leads to a general change of the measured attitude $A_B^I$, in the example a gradual rise. Still, the beam is steered in beam stabilization mode S1.

At time t3, i.e. after a time period Δt1 exceeding a defined time period ΔT1, the rise of attitude $A_B^I$, ΔA1 has exceeded a predefined value Δ1. This is detected by the beam steerer controller. As a result, the controller switches from stabilization mode S1 to stabilization mode S2. Said otherwise, if the change of position (one or more translational and/or rotational positions, e.g. the rotational data provided by the device's IMU) reaches a set threshold within a set time period (e.g. the position gradient or velocity within a certain time is above a gradient or velocity threshold), the switch between beam steering operating modes, e.g. stabilization modes S1 and S2, is triggered.

In the example, from time t3 on, the beam is steered in beam stabilization mode S2. The beam then follows (completely) the intended movement of the housing, whereby any "missed" intended movement (movement from time t2 to t3), which has been compensated by the controller in the stabilization mode S1 can optionally be caught up for.

From time t4 on, the user stops the voluntary shift of the housing as the beam has reached the intended object point. At time t5, for a second time period Δt2 exceeding a second defined time period ΔT2, the change of attitude $A_B^I$, ΔA2 has been below a predefined value Δ2. As a result, the controller switches back from semi-stabilization mode S2 to the more rigid stabilization mode S1.

Optionally, the automatic switching depends on the distance to the object point measured by the EDM. If for example the object point is rather far away, the switching is set to a greater sensitivity, that means in the example the threshold Δ1 is lowered, and the other way around for nearby points.

As another option, any automatic beam steering operating mode switching is adaptable by machine learning. For example, the device can learn how fast a specific user moves the device if he indeed wants to switch from a first mode S1 to second beam steering operating mode S2 or more generally spoken, the device learns by training to distinguish better between unintentional movement and intentional movement.

Figure 4A:
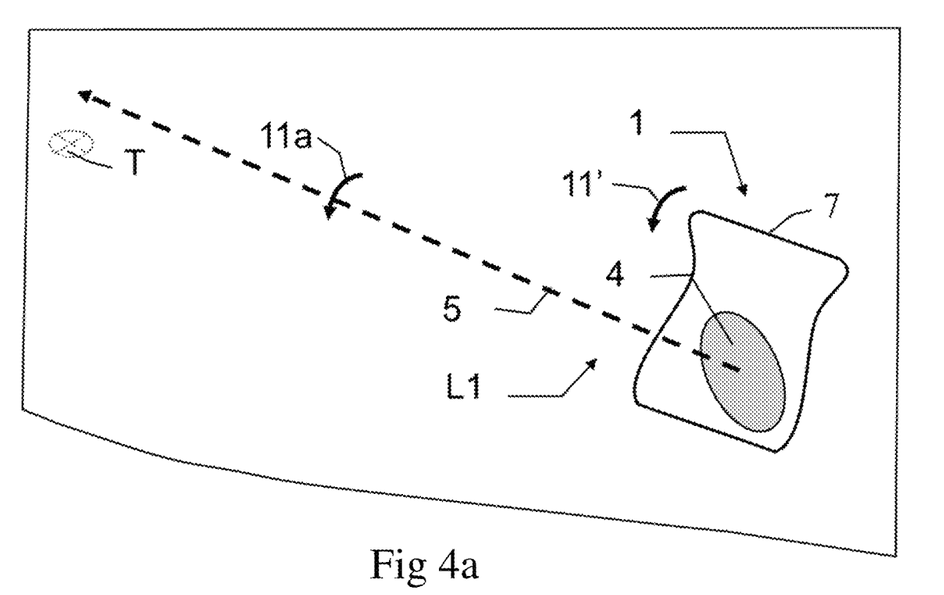
FIGS. 4a-4c show an example for a first and a second beam lock operating mode.
Figure 4B:
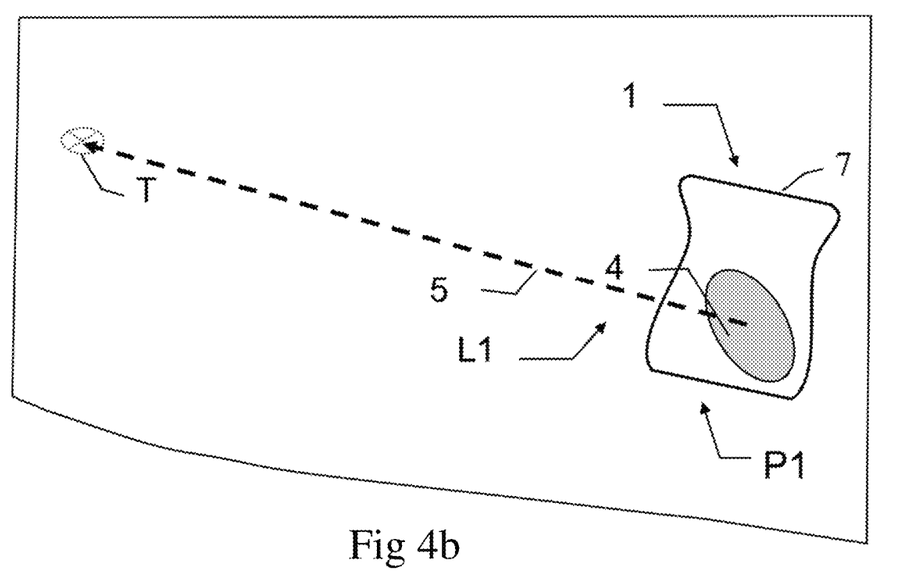
Figure 4C:
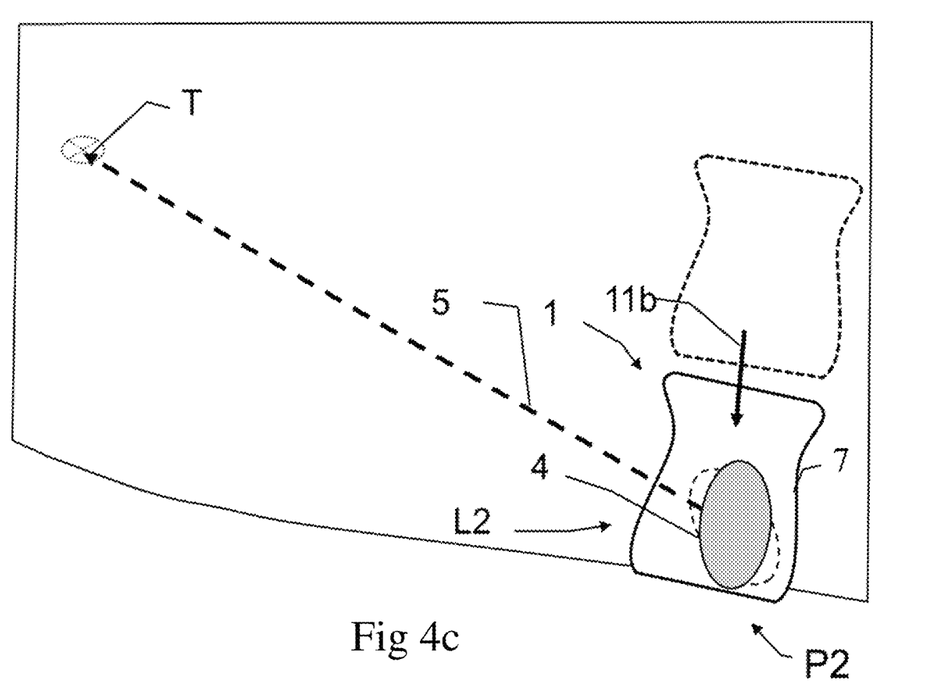

FIG. 4a-4c show an example for further beam steering operating modes. In FIG. 4a, a first beam lock mode L1 is illustrated. When the beam steerer is operated in this first lock mode L1, the alignment of the beam 5 is fixed relative to the housing 7 and with respect to the device 1 itself. Said otherwise, the emission direction of the laser is locked relative to the housing 7. Before locking the beam 5, the user might have manually adjusted the beam alignment as desired, e.g. a beam steering angle of 0°, 30°, 45° or 90° or any angle in between relative to a "vertical" axis of the housing.

As shown in FIGS. 4a and 4b, in order to measure a desired object or target point T, the user first moves the handheld device 1 to a location from where there is a free line-of-sight both to the total positioning system (TPS) and to the target to be measured and turns the device 1 as need (indicated by arrow 11'). The user uses the visible laser pointer to aim to the target T from this first device's position P1 and performs remote point measurements or markings from the first position P1 of the device 1. As the beam 5 is operated in first lock mode L1 with fixed alignment relative to the housing 7, the beam 5 simply follows the housing's movement resp. a movement of the user's hand (arrow 11a). If the locked alignment angle is for example 0', the handling of the device 1 is comparable to prior art surveying pole with the beam 5 pointing at the point T instead of the pole's tip, advantageously without the need of moving a bulky rod and with the possibility to alter and lock the aiming direction at (nearly) any desired direction.

After having measured or marked the target point T from the first position P1, the device 1 is moved to a second position or stationing P2 while the beam steerer 4 is operated in a second beam lock mode L2. In the second beam lock mode L2, the beam 5 is automatically steered in such a way that the beam 5 is locked onto the target point T (indicated in the figure by changed position of the steering mirror).

Hence, despite the movement of the device 1 to a next measurement stationing, the beam 5 always aims at target point T.

In other words, once a point of interest T is aimed, a second "lock" mode L2 can be activated in order to keep the laser on this point T even if the handheld device 1 is moved further. This allows for repeated measurements from several locations P1, P2 of the handheld device 1 or to allow a movement of the operator without losing the area of interest which the laser 5 aims at.

Figure 5:
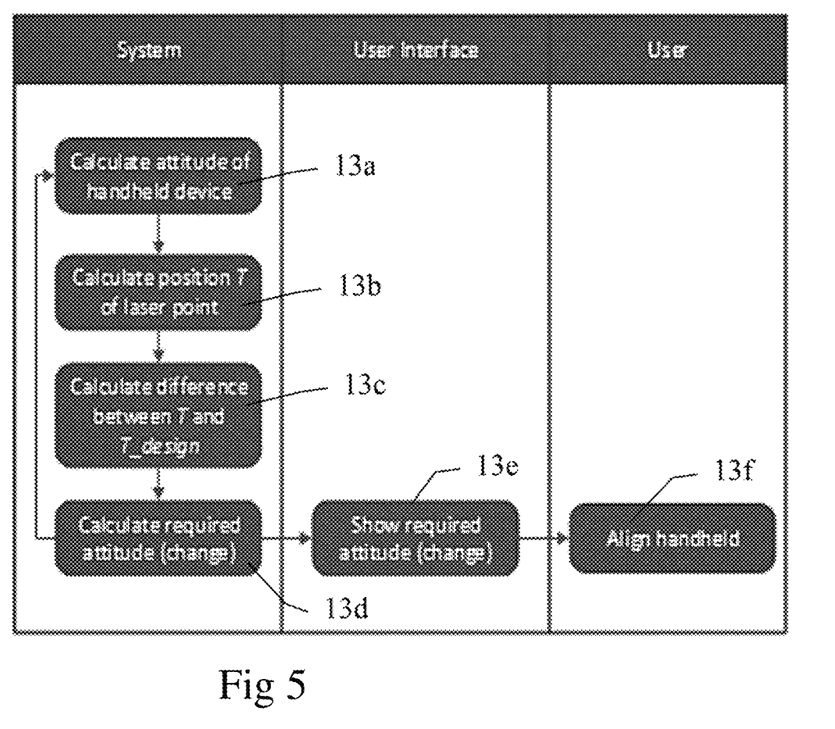
FIG. 5 shows an example for user guidance.

Particularly for stake out-tasks, the first beam lock mode L1 comprises user guidance 13a-13f as shown in FIG. 5. The beam steering element is set to a fixed alignment from the handheld. The user aims to a first rough position T close to the design point T design. The attitude of the handheld device is calculated, step 13a. Then, the currently aimed at position T is calculated, step 13b. The difference resp. attitude between current point T and design point T design is calculated based on design and measurement data, step 13c. Then, the required attitude (change) is calculated, step 13d and shown to the user (step 13e) as beam steering user guidance information so that he can then update the aiming of the device (step 13f).

The user guiding information 13e can be displayed on a user interface of the device or of a connected additional device such as a smartphone, laptop, AR-glasses, field controller or total station, wherefore the device comprises a data transmitter for transmittance of user guidance data to the external device. Optionally, the user guidance information is displayed by the marking beam or an additional projector, projecting the information on an objects surface. Additionally or alternatively, user guidance can be done using audio signals.

As a general option, the device 1 comprises a graphic projection mode as beam steering operating mode. In executing this projection mode, the laser beam is automatically steered in such a way that a visual graphic is projected on an object's surface, e.g. a wall. Besides user guiding information as described above, the graphic can be a user navigation information which indicates a direction or distance to an object or point of interest. As further examples, direction or distance to the master or reference station (Total Station) can be projected or to any other external position reference, or the north direction can be projected. Such visual navigation projection by automatic beam steering is particularly useful in large or dark measurement surroundings such as tunnels.

Figure 6:
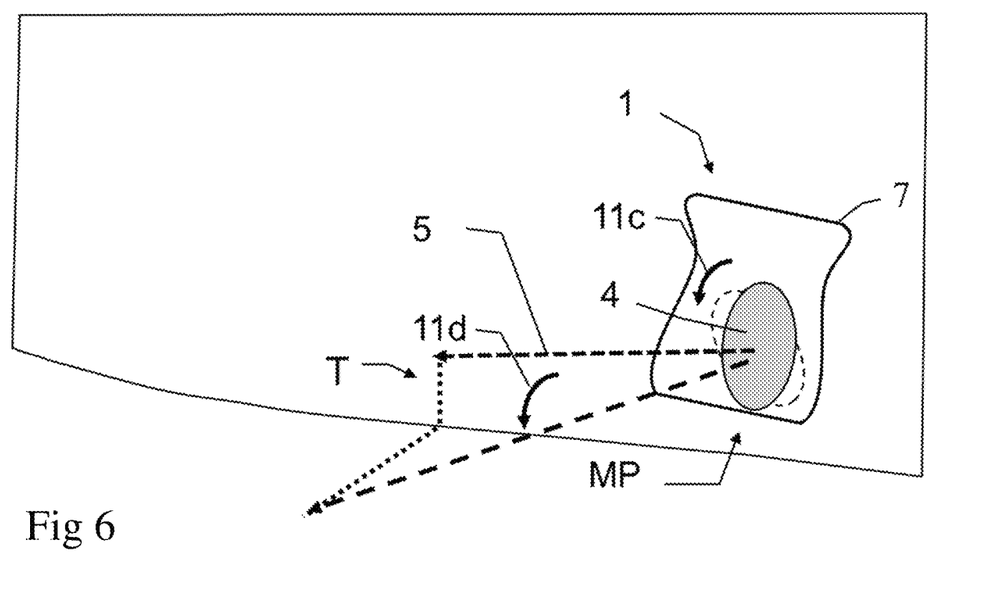
FIG. 6 shows an example for a multi-point operating mode.

FIG. 6 illustrates another beam steering operation mode MP. In the figure, the beam steerer 4 is operated in a multi-point mode MP whereby the controller automatically steers the beam 5 in such a way (arrow 11d), e.g. by moving the beam steering mirror as indicated by arrow 11c, that a multitude of neighboured target points T is measured and/or marked. In the example, the beam 5 is steered continuously "downwards" wherefore a dense line of target points T is formed. This operating mode is for example useful for measuring a corner or edge of a room as shown. If a line of points T is to be marked, the laser beam 5 can be steered repeatedly to and from such that by swinging the laser beam, a virtually continuously visible line is formed.

The multi-point mode MP can be configured such that a plurality of geometric forms or beam patterns can be performed, e.g. measuring or marking a dense point area such a 0.3 m×0.5 m rectangle, whereby the point density may be set by the user automatically set by the controller dependent on measurement parameters such as steering rate or measured distance to the object.

Gesture control of the device 1 as exemplified above (referring to stabilization modes S1 and S2) is for example usable for such a multi-point mode MP: if, for instance, a circle of points T has to be measured or marked, the user first makes a circle-like gesture with the device 1 in its hand which is recognized by the controller through the IMU-sensing data and interpreted as command for execution of the multi-beam mode with steering the beam 5 in such a way that it forms a circle on the object. Second, the user points a defined time period at the intended centre of the circle and e.g. at a point indicating the desired radius, for example for three seconds each. Then, the device automatically measures the circle at the centre pointed at with the indicated diameter. Alternatively or additionally, a certain movement pattern can be criterion for automatic operating mode switching.

Figure 7A:
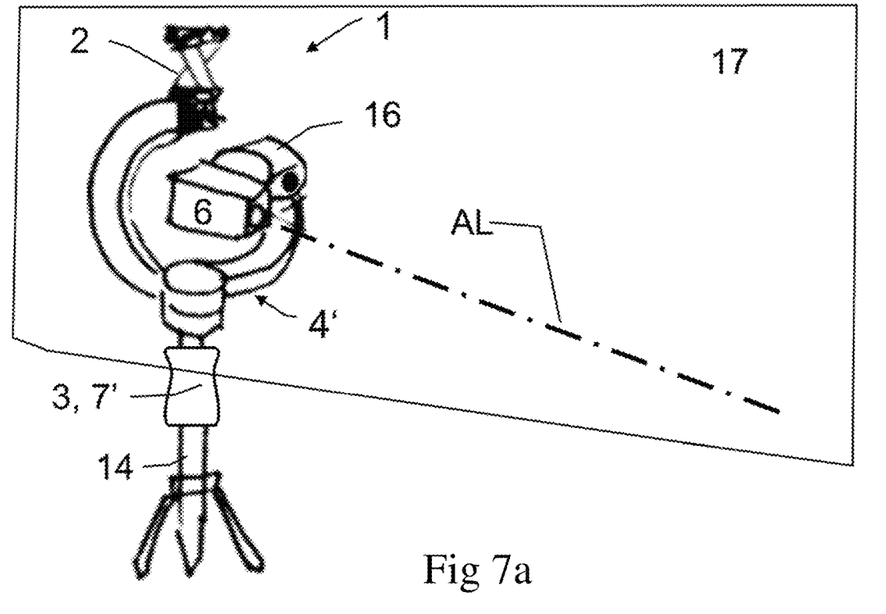
FIGS. 7a-7c show an example for further embodiment of the device and examples of a first and a second beam auto-alignment operating mode.
Figure 7B:
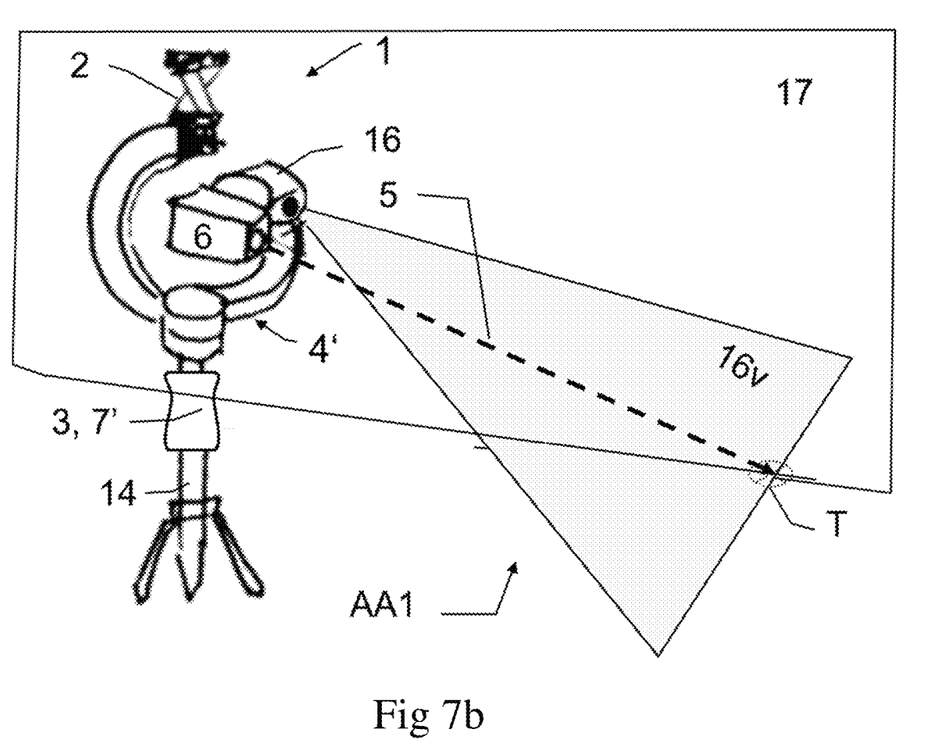
Figure 7C:
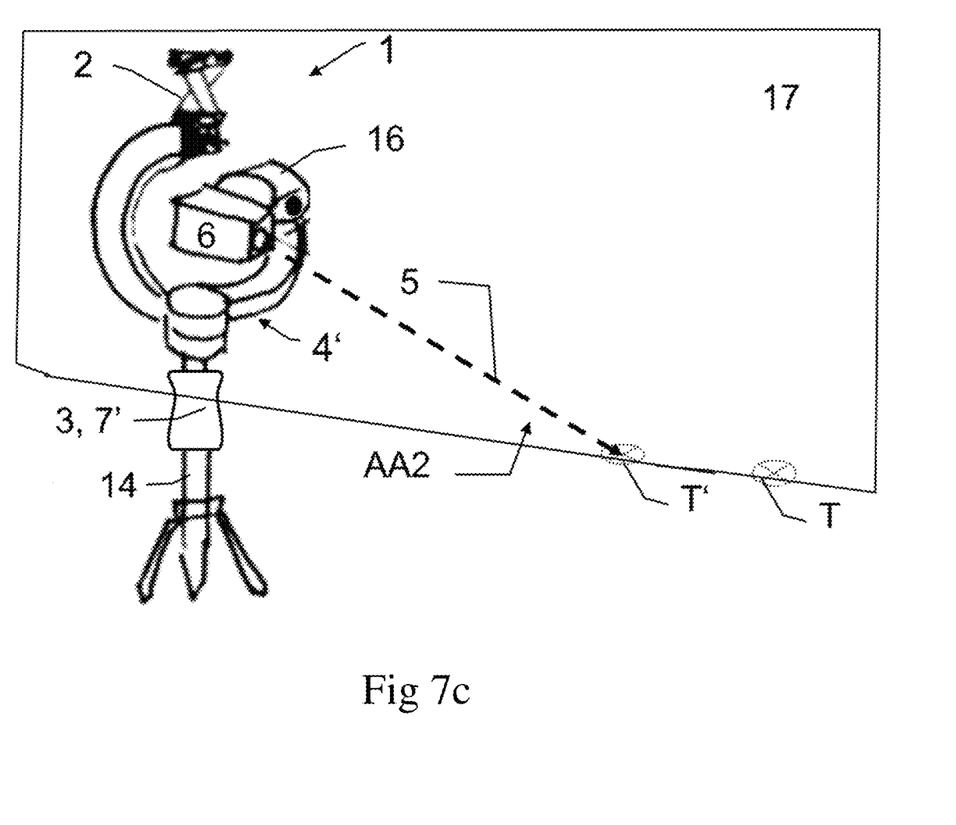

FIGS. 7a to 7c illustrate another embodiment of a device 1 and further beam steering operating modes AA1, AA2. In the shown embodiment, the device 1 comprises a motorized gimbal 4', mounted on a stand 14. The stand 14 comprises a grip 7' and the IMU 3, which is in the example integrated into resp. inside the grip 7'. Alternatively, tilt sensors and an orientation sensor for measuring the heading can be used.

The gimbal 4' serves as holder for the prism 2 and beam source resp. EDM/laser pointer module 6 and as beam-steering element for the EDM/laser pointer module such that the beam alignment AL can be controlled by the gimbal 4'. The gimbal 4' consists of two axes connected sequentially, equipped with motors and angle encoders.

The first axis is connected to the outside world (user, stand 14, . . . ), the second axis carries the EDM/Laser pointer 6. A control system is used to automatically control the attitude of the EDM/Laser pointer 6 which helps to stabilize the pointer 6 and is beneficial for measurement as well as for stake out tasks.

In the example, the device 1 is positioned and oriented such that the laser 6 roughly points at the edge of the wall 17. According to a first auto-alignment mode, the fine-alignment is executed, wherein the beam then is steered automatically to an object point of interest as is illustrated in following FIG. 7b.

In FIG. 7b is shown that as soon as close the target point T is, e.g. design point, the fine aiming is then automatically performed in the first auto-alignment mode AA1 by the beam-steering element 4' which precisely aligns the EDM 6 to the design point T. Once the EDM 6 is correctly aligned, in the example the spot is made visible by activating the laser pointer mode, so that the user can add a physical marking.

If subsequently a lock mode as described with reference to FIG. 4c is (preferably automatically) activated as beam steering operating mode, the laser spot remains on the correct marking location, no matter if the handheld device 1 is moved further or hold still (by using the optional stand 14).

In particular for automatic alignment of points T to be measured, the device 1 optionally comprises a search or overview camera 16, with a field of view 16v, covering an area surrounding the alignment direction AL of the beam steerer 4'. Using known image processing techniques, features such as edge of wall 17 are automatically recognized in an image of the camera 16. The beam 5 is then automatically fine-steered according to the operating mode AA1 to the recognized object feature T. The auto-alignment can e.g. take place within the range corresponding to the field of view 16v of the camera or within a defined solid angle around an initial beam alignment AL as shown in FIG. 7a.

FIG. 7c illustrates a second auto-alignment operating mode AA2 of beam steerer 4'. Once manual or automatic alignment to a first target point T is done, the laser beam 5 will be automatically aligned to the next close target point T'. The next point T' is for example a next design point or another feature point recognized by camera 16.

The second auto-alignment mode AA2 thus allows for automatic measurement and/or marking of a sequence of points of interest T, T' within a certain area, e.g. design points which are situated nearby to each other or all design points which refer to the same entity or construction section. In case of stake out, the points of interest T, T' can be repeatedly marked. For example, first point T for a time period of ten seconds is marked, then the beam 5 automatically jumps to next point T', marks it for another ten seconds, and then jumps back to first point T, marking it for ten seconds and so on. Alternatively, the camera 16 resp. image processing is designed such in a camera image it is automatically detected if a user has finished permanently marking or operating at first point T or not yet. If the device 1 detects that first point T is finished, the beam 5 is automatically aligned such that it marks the next point T'.

A skilled person is aware of the fact that details, which are here shown and explained with respect to different embodiments, can also be combined in other permutations in the sense of the invention if not indicated otherwise. In particular, different beam steering operating modes can be combined, for example a beam stabilization operating mode with a beam lock operating mode.

The invention claimed is:

1. A hand-holdable coordinate measuring device and/or stake out device configured to be hand-held with at least one hand for free carriage and movement by a user, the device comprising:
    position giving means for determination of an actual translational position of the device using an external position reference and orientation giving means for determination of an actual rotational position of the device such that the actual position of the device with respect to all six degrees of freedom of the device can be determined,
    a radiation source for generation of a radiation beam as a measuring and/or marking beam for measuring and/or visually marking of an object point,
    a beam steerer for automatic steering of an alignment of the radiation beam,
    wherein the beam steerer comprises at least two beam steering operating modes,
    which differ in the manner of automatic steering the beam alignment,
    wherein the beam steerer is designed to switch automatically between the two operating modes in dependence on sensor data, wherein:
        the sensor data is provided by a sensor of the device; and/or
        the beam steerer is designed to adapt the automatically switching, to a respective user.

2. The device according to claim 1, wherein the beam steerer is designed to switch automatically between the first and the second stabilization mode in dependence on a sensed movement of the device.

3. The device according to claim 2, wherein switching is executed if the shift tendency is above or below a defined threshold and/or if a shift pattern is sensed.

4. The device according to claim 1, wherein one of the operating modes is an auto-align mode designed to automatically steer the radiation beam to an object point of interest, wherein:
    the object point of interest is automatically detected by the device based on data of a device's sensor; and/or
    the radiation beam is successively aligned such that a sequence of object points of interest is automatically measured and/or marked.

5. The device according to claim 1, wherein one of the operating modes is a multi-point mode designed to steer the radiation beam continuously in a direction such that a multitude of neighbored object points is measured and/or marked.

6. The device according to claim 1, wherein one of the operating modes is a graphic projection mode designed to automatically steer the radiation beam in such a way that a visual graphic is projected by the radiation beam onto an object's surface.

7. The device according to claim 6, wherein the visual graphic is a user navigation information indicating:
    a direction and/or distance to an object point to be measured and/or marked;
    a geographic direction; or
    a direction and/or distance to the external position reference.

8. The device according to claim 1, wherein the beam steerer comprises:
    an active gimbal, wherein the gimbal is carrying or encasing the radiation source, and/or
    a micro scanning mirror, a scanning galvo mirror and/or an array of movable mirrors, and/or
    at least one rotatable wedge prism.

9. The device according to claim 1, wherein the orientation giving means is embodied as an Inertial Measurement Unit and/or tilt and heading sensors.

10. The device according to claim 1, wherein the position giving means is embodied as a retroreflector or a GNSS-module.

11. The device according to claim 1, wherein the radiation source is part of an Electronic Distance Meter.

12. The device according to claim 1, wherein the device comprises:
    a separate user button which is conceived and reserved for manually switching between the two operating modes, and/or
    a display unit designed for user beam steering guidance and/or a data transmitter designed for transfer of user beam steering guidance data to an external display, and/or
    is body-wearable.

13. The device according to claim 1, wherein one of the operating modes is a multi-point mode designed to steer the radiation beam continuously in a direction such that a multitude of neighbored object points is measured and/or marked in form of a dense point line or dense point area.

14. A surveying system comprising:
    a surveying instrument, and
    a coordinate measuring and/or stake out device according to claim 1.

15. The system according to claim 14, wherein the system comprises a computer with an state estimator algorithm designed for computation of the actual position of the device.

16. The system according to claim 15, wherein a distance measured with the radiation beam is fed into the state estimator for the position computation.

17. The surveying system comprising:
a surveying instrument selected from a total station and/or a GNSS survey pole, and
a coordinate measuring and/or stake out device according to claim 1.

18. A hand-holdable coordinate measuring device and/or stake out device configured to be hand-held with at least one hand for free carriage and movement by a user, the device comprising:
position giving means for determination of an actual translational position of the device using an external position reference and orientation giving means for determination of an actual rotational position of the device such that the actual position of the device with respect to all six degrees of freedom of the device can be determined,
a radiation source for generation of a radiation beam as a measuring and/or marking beam for measuring and/or visually marking of an object point,
a beam steerer for automatic steering of an alignment of the radiation beam,
wherein the beam steerer comprises at least two beam steering operating modes,
which differ in the manner of automatic steering the beam alignment,
wherein the at least two operating modes comprise a first and a second stabilization mode for stabilization of the beam alignment in order to compensate unintentional movements of the device, wherein:
in the first stabilization mode the beam alignment is strictly stabilized; and
in the second stabilization mode the beam alignment is semi-stabilized such that the radiation beam follows a shift tendency of the device.

19. A hand-holdable coordinate measuring device and/or stake out device configured to be hand-held with at least one hand for free carriage and movement by a user, the device comprising:
position giving means for determination of an actual translational position of the device using an external position reference and orientation giving means for determination of an actual rotational position of the device such that the actual position of the device with respect to all six degrees of freedom of the device can be determined,
a radiation source for generation of a radiation beam as a measuring and/or marking beam for measuring and/or visually marking of an object point,
a beam steerer for automatic steering of an alignment of the radiation beam,
wherein the beam steerer comprises at least two beam steering operating modes, which differ in the manner of automatic steering the beam alignment,
wherein the at least two operating modes comprise a first and a second beam lock mode, wherein
in the first lock mode the beam alignment relative to the device is locked; and
in the second lock mode the radiation beam is locked onto an object point.

* * * * *